United States Patent [19]

Baker et al.

[11] Patent Number: 4,807,840
[45] Date of Patent: Feb. 28, 1989

[54] TUNED MASS DAMPING SYSTEM AND METHOD

[76] Inventors: George S. Baker, 603 E. Harwood St., Orlando, Fla. 32803; Herbert B. Rothman, 32 Hilltop Dr., Syosset, N.Y.

[21] Appl. No.: 789,063

[22] Filed: Oct. 18, 1985

[51] Int. Cl.$^4$ ............................................. F16M 13/00
[52] U.S. Cl. ...................................... 248/559; 248/562
[58] Field of Search ............... 248/559, 550, 636, 638, 248/562, 566, 608; 52/1, 167; 188/378, 379, 380; 267/154, 155

[56] References Cited

U.S. PATENT DOCUMENTS

| | | | |
|---|---|---|---|
| 2,749,570 | 6/1956 | Alder | 267/155 X |
| 2,887,071 | 5/1959 | Settles | 105/392.5 |
| 2,978,213 | 4/1961 | Kass | 248/559 |
| 3,145,012 | 8/1964 | Kfoury | 188/380 X |
| 3,172,461 | 3/1965 | Langer | 267/154 X |
| 3,464,657 | 9/1969 | Bullard | 248/550 |
| 3,782,506 | 1/1974 | Yarrington | 188/378 |
| 4,033,566 | 7/1977 | Petersen | 267/126 |
| 4,098,034 | 7/1978 | Howell | 52/1 |
| 4,402,483 | 9/1983 | Kurabayashi | 248/559 X |
| 4,453,693 | 6/1984 | Krux | 248/559 |

FOREIGN PATENT DOCUMENTS 97341  6/1984  Japan .................................. 188/378

OTHER PUBLICATIONS

Timoshenko, Young, Weaver, "Vibration Problems in Engineering, 4th Ed.", John Wiley and Sons, Inc., 1974, p. 85.
"Shock and Vibration Handbook", 2nd Ed., editors Harris and Crede, McGraw-Hill Book Co., Inc., New York, NY, 1976, p. 6-15.
"Shock and Vibration Handbook", 2nd Ed., editors Harris and Crede, McGraw Hill Book Co., Inc., New York, NY, 1976, pp. 30-8, 30-15.
Simiu, "Modern Developments in Wind Engineering, Part 4 (Final Report)", Pub. in Engineering Structures 5, n4, Oct. 1983, p279f.
Wiesner, "Tuned Mass Dampers to Reduce Wind Motion", presented at ASCE National Convention, Boston, Mass., Apr. 2-6, 1979, Asce Preprint No. 3510, p4f.
DenHartog, "Mechanical Vibrations", McGraw-Hill Book Co., Inc., New York, NY, 1956, pp. 93-104.

Primary Examiner—J. Franklin Foss
Attorney, Agent, or Firm—Duckworth, Allen, Dyer & Doppelt

[57] ABSTRACT

A damping system for attenuating the transverse oscillation of a structure caused by external forces having a countermass attached to the structure by a spring and a coulomb damper. The parameters of the damping system are chosen so that the natural frequency of the damping system matches the natural frequency of oscillation of the structure.

16 Claims, 3 Drawing Sheets

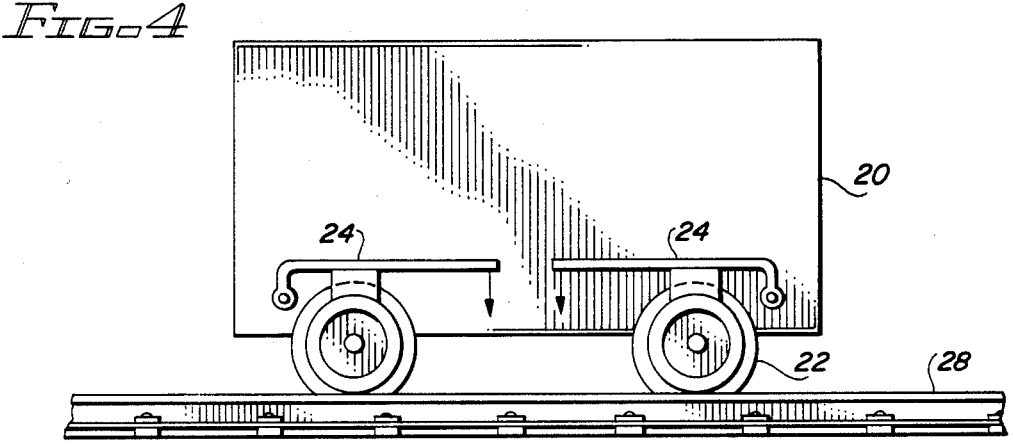
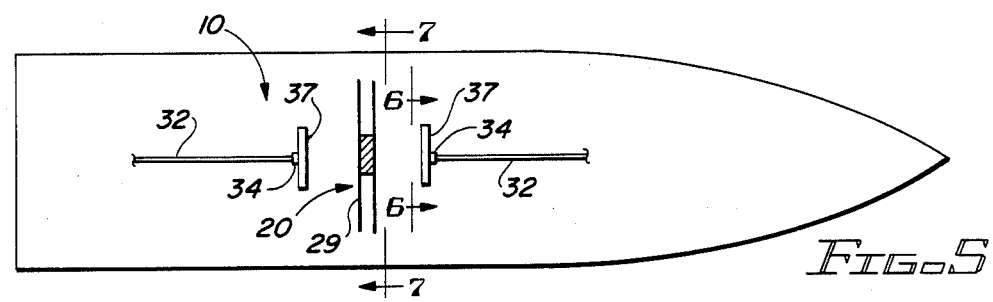
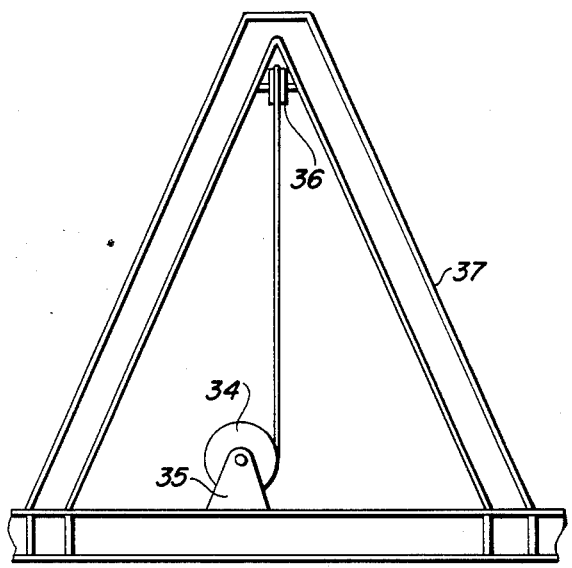
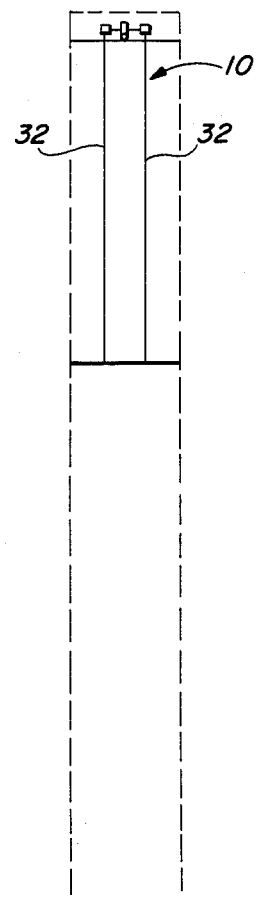
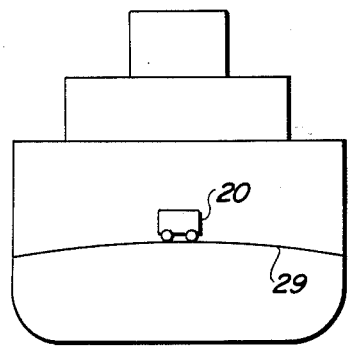

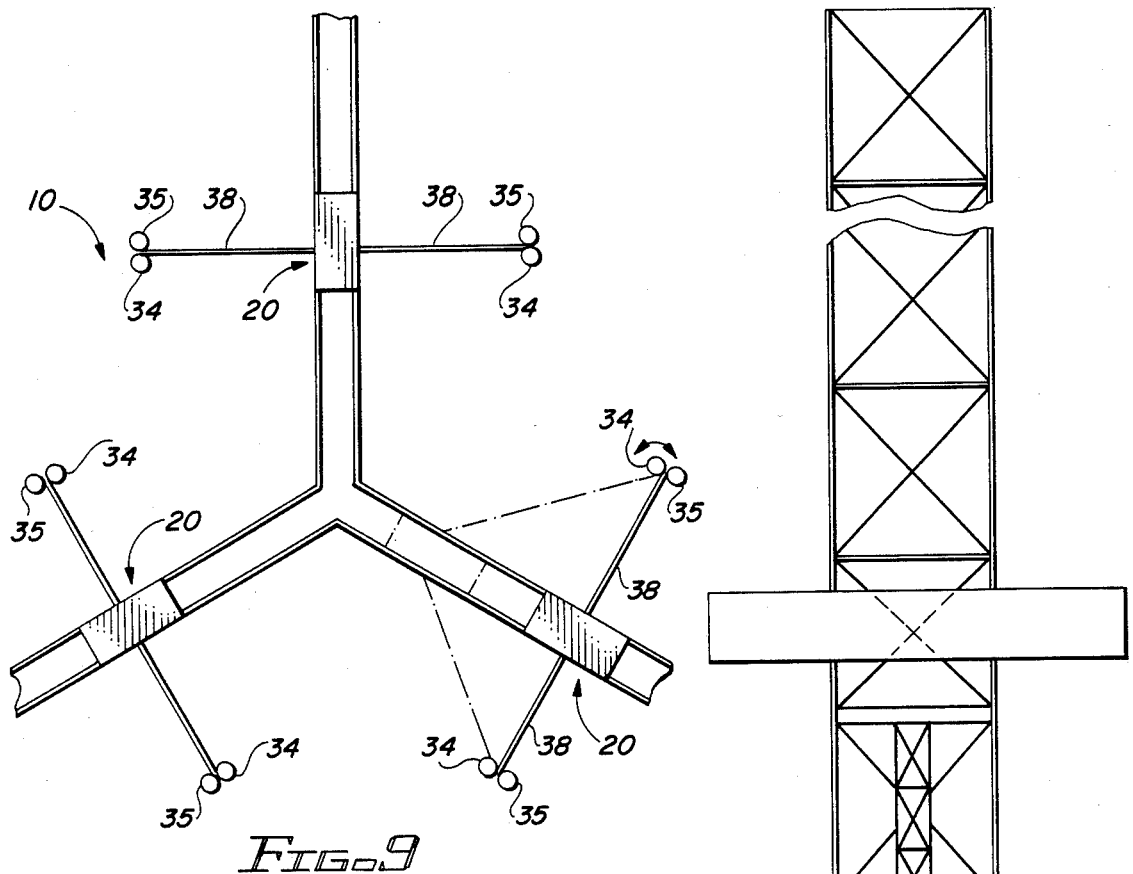
FIG-9
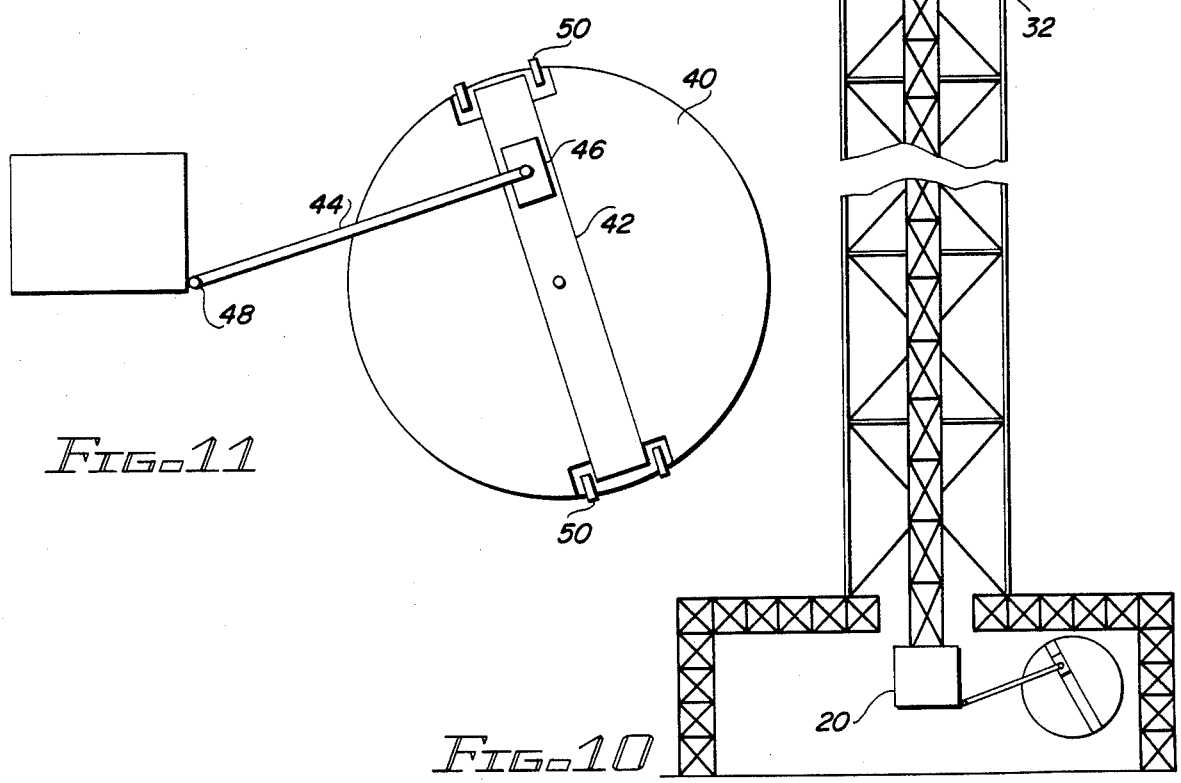
FIG-11
FIG-10

TUNED MASS DAMPING SYSTEM AND METHOD

BACKGROUND OF THE INVENTION

This invention relates to passive tuned-mass damping systems and, more particularly to a passive tuned-mass damping system utilizing coulomb damping.

In principle it is well known that oscillations in a structure can be diminished by attaching a relatively small mass to the structure by means of a suspension including a spring and a damper. By correctly matching the mass with the relevant parameters of the structure and the suspension, a condition can often be reached in which oscillating transverse forces set up against the structure by the wind or otherwise are opposed by equal and opposite transverse forces due to the oscillation of the mass, whereby the amplitude of vibration of the structure at a resonant frequency can be restricted significantly.

Prior patents to damping systems include: U.S. Pat. No. 2,887,071 to Settles; U.S. Pat. No. 3,782,506 to Yarrington; U.S. Pat. No. 4,033,566 to Petersen; U.S. Pat. No. 4,098,034 to Howell; U.S. Pat. No. 4,320,602 to Richardson; U.S. Pat. 4,360,087 to Curwen; U.S. Pat. No. 4,483,425 to Newman; U.S. Pat. No. 4,512,448 to Estang; U.S. Pat. No. 4,514,942 to Pocanschi; and U.S. Pat. No. 4,524,851 to Sawano et al.

SUMMARY OF THE INVENTION

The present invention teaches a spring-mass system for reducing vibrations within a structure caused by an external forcing function. The system dissipates the dynamic energy of the structure using coulomb damping rather than viscous damping. Coulomb damping results from the frictional sliding of two surfaces. The damping force is equal to the product of the normal force and the coefficient of friction between the two surfaces and is independent of velocity once the motion is initiated.

A system using the invention has a mass attached to a structure by a spring and a coulomb damper. The spring and mass are appropriately selected so that the damping device has a resonant frequency at or near that of the structure. When little or no vibration of the structure occurs, the mass is rigidly joined to the structure by the friction device and damping is absent from the system. When a time-dependent harmonic force or a random force having frequency components near the natural frequency of the structure acts upon the structure, its amplitude of oscillation will increase until acceleration exists sufficient to overcome the friction force of the damping device. The device will alternately stick and slip, allowing a discontinuous relative movement between the mass and the structure. If the external forces are great enough, the acceleration and kinetic energy of the mass will reach a magnitude sufficient to exceed the restraining force of the friction device at all times in the cycle of oscillation and the mass will move in a smooth oscillation of increasing amplitude, similar to the response of an undamped oscillator to a forcing function at resonance. Motion of the mass with respect to the structure is caused by energy transfer from the structure to the damping system. As the oscillation amplitude of the mass increases, the oscillation amplitude of the structure decreases until the structure nears a resting position. As the oscillation amplitude of the structure is reduced, energy input from external forces and energy transferred to the mass are reduced and the amplitude of the mass decreases linearly as energy is dissipated through the coulomb damper. The inherent instability of the coulomb damping system allows a nearly complete transfer of energy from the structure to the damper and results in the overall stability of the combined system.

In accordance with the preferred embodiment of the present invention the parameters of the system are selected such that the rate of dynamic transfer of energy from the damping system back into the structure is less than the rate of energy dissipated by the coulomb damper. Thus, the amplitude of the structure remains low until the damping system returns to the stick-slip movement. Since the amount of energy dissipated by the coulomb damper during its stickslip movement is not great enough to overcome the energy input from the external forces, oscillation of the structure again increases in amplitude and the cycle begins anew.

BRIEF DESCRIPTION OF THE DRAWING

The foregoing and other features, objects and advantages of the invention will become more apparent by reference to the accompanying drawings and the following detailed description taken in conjunction with the accompanying drawings in which:

FIG. 4 is a side plan view of the countermass of the damping system in FIG. 2;

FIG. 5 is a top plan view of a modified damping system attached to a ship;

FIG. 6 is a cross-section VI—VI from FIG. 5;

FIG. 7 is a cross-section view VII—VII from FIG. 5;

FIG. 8 is a side plan view of a modified damping system attached to a building;

FIG. 9 is a top plan view of the damping system of FIG. 8;

FIG. 10 is a side plan view of a modified damping system attached to a tower; and FIG. 11 is an enlarged side view of the countermass and flywheel of FIG. 10.

DESCRIPTION OF THE PREFERRED EMBODIMENT

Figure 1:
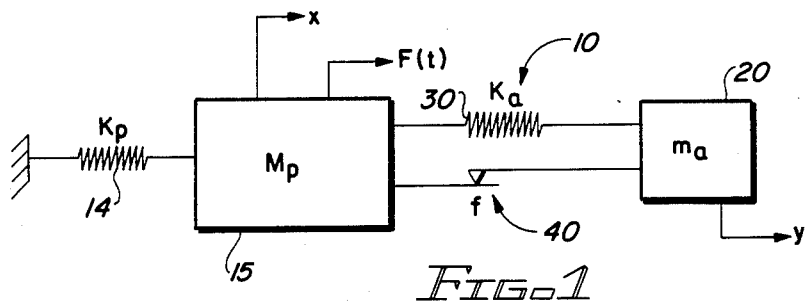
FIG. 1 is a schematic drawing of a damping system in accordance with the present invention.

FIG. 1 shows a schematic of a vibration damping system 10 in accordance with the present invention combined with a structure, represented by a primary spring 14 and a primary mass 15, whose vibration is to be attenuated. The damping system 10 has a countermass 20, a spring 30, and a coulomb damper 40 in which the countermass 20 is attached to the primary mass 15 by the spring 30 and the coulomb damper 40. The parameters of the damping system 10 are selected so that the natural frequency of oscillation of the damping system 10 matches the natural frequency of oscillation of the structure with the added mass of the damping system 10. The natural frequency of a spring-mass system is given by the equation $$w_n = (k/m)^{\frac{1}{2}} \qquad (1)$$

where $W_n$ is the natural frequency of oscillation, k is the spring stiffness and m is the mass. Thus, the relation of the damping system 10 to the structure is given by the equation $$(k_c/m_c)^{\frac{1}{2}} = [K_p/(M_p+m_c)]^{\frac{1}{2}} \quad (2)$$

or $$k_c/m_c = K_p/(M_p+m_c) \quad (3)$$

where $K_c$ is the spring stiffness of the spring 30, $m_c$ is the mass of the countermass 20, $K_p$ is the spring stiffness of the primary spring 14, and $M_p$ is the mass of the primary mass 15. The natural frequency of oscillation of the damping system may be chosen to be somewhat higher or lower than that of the structure with the added mass of the damping system 10.

When an external force, F(t), having frequency components near the natural frequency of the structure acts upon the structure, the structure and damping system 10 begin to oscillate with the auxiliary mass 20 rigidly fixed to the structure by the coulomb damper 40. As the amplitude of the oscillation increases, due to the external force, the acceleration of the countermass 20 and primary mass 15 increases until the force of friction of the coulomb damper 40 is overcome. The acceleration at which the force of friction is incapable of restraining motion of the countermass 20 with respect to the primary mass 15 is given by the equation $$a = f/m_a \quad (4)$$

where a is the acceleration and f is the force of friction of the coulomb damper 40. If the external forces are great enough, the acceleration and kinetic energy of the countermass 20 will reach a magnitude sufficient to exceed the restraining force of the friction device at all times during the cycle of oscillation and the mass will move in a smooth oscillation of increasing amplitude, as in an undamped system.

The energy dissipated by any damping system is given by the equation $$W_d = \int F_d dx \quad (5)$$

where $W_d$ is the energy dissipated by the damper and $F_d$ is the damping force. Since the damping force with coulomb damping is a constant, equal to the force of friction, the equation becomes $$W_d = f \int dx \quad (6)$$

Thus, the energy dissipated by the coulomb damper 40 is equal to the force of friction of the coulomb damper 40 times the displacement of the countermass 20 relative to the structure. As the oscillation of the countermass 20 increases in amplitude the energy dissipated by the coulomb damper 40 increases. The dynamic energy of the structure decreases due to dynamic coupling with the damping system 10 until the structure briefly ceases to oscillate. The work done on the structure by the external force, F(t), is reduced to zero at this time. While the structure is nearly immobile, the energy contained in the damping system 10 is dissipated and the energy supplied by the external force is less than the energy dissipated by the damper. As energy is dissipated by the damper 40, the amplitude of the countermass 20 decreases and therefore the energy dissipated by the damper 40 decreases. When the energy dissipated by the damper 40 decreases below the energy input to the structure by the external force, the oscillation of the structure, again, increases in amplitude. Thus the cycle is repeated until the external force subsides.

Figure 2:
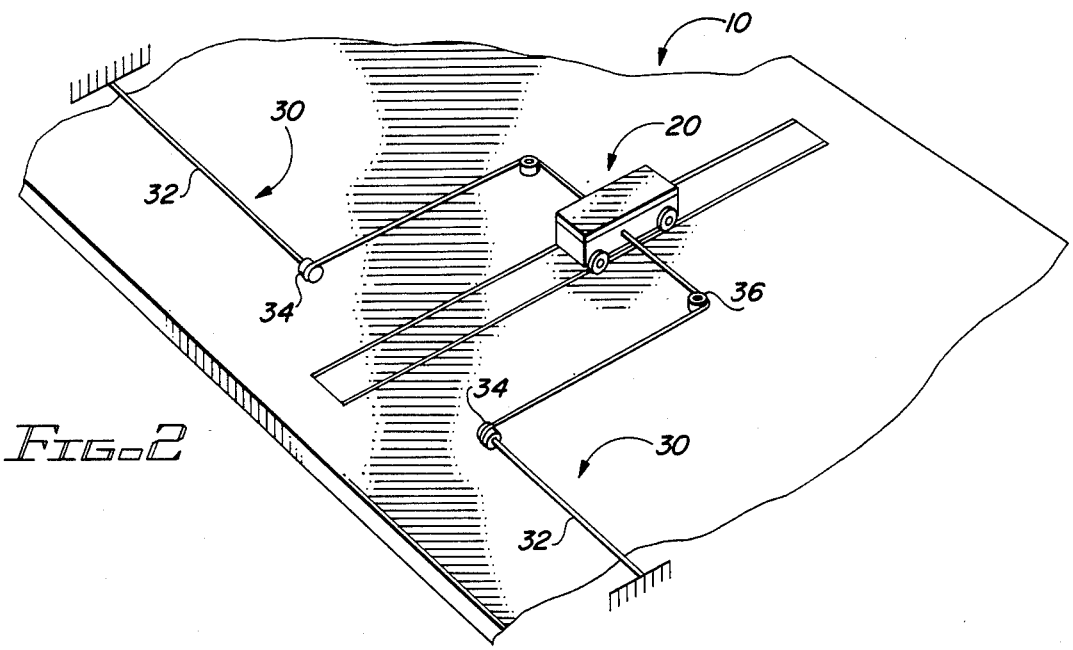
FIG. 2 is a perspective view of a modified damping system attached to a bridge.
Figure 3:
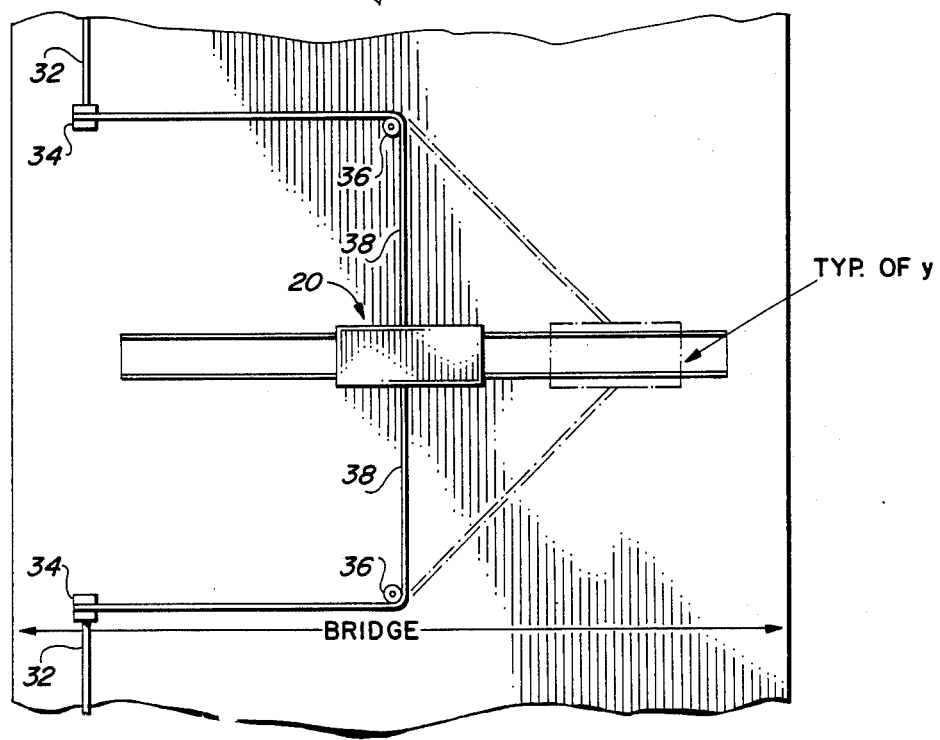
FIG. 3 is a top plan view of the damping system in FIG. 2.

FIGS. 2 and 3 illustrate one embodiment of the present invention in which a damping system 10 is attached to a bridge to dissipate vibrational forces. Here, two torsional springs 30 connect the countermass 20 to the bridge to enable the countermass 20 to oscillate in a transverse direction relative to the bridge when the bridge is subject to vibration stimulating forces. Each torsional spring 30 includes a torsion bar 32 having a first end fixed to the bridge with its longitudinal axis normal to the line of motion of the countermass 20 relative to the bridge and a second end with a spool 34 fixed thereto. Two pulleys 36 are respectively attached to the bridge such that a line containing the two pulleys 36 perpendicularly intersects the line of motion of the countermass 20 with the two pulleys 36 equidistant from the countermass 20 at any point along the line of motion of the countermass 20. Two equally tensioned cables 38 having first ends connected to the countermass are respectively strung across the pulleys 36 and attached to a corresponding one of the two spools 34. A sufficient length of each cable 38 is wrapped around its corresponding spool 34 to enable the countermass to oscillate. Each spool 34 is attached to the structure by way of a bracket (not shown) or other means well known in the art for constraining tangential movement of the spool 34 while permitting rotational movement of the spool 34. As shown in FIG. 3, when the countermass 20 moves in a transverse direction relative to the bridge, the cable 38 exerts movement on the torsion bar 32 causing the torsion bar 32 to twist. Thus, the torsion bar 32, pulley 36 and cable 38 act as a spring to allow the countermass 20 to oscillate in a transverse direction relative to the bridge when the bridge is subject to vibration stimulating forces.

Reference is now made to FIG. 4 which illustrates the countermass 20. A plurality of wheels 22, preferably four, are attached to the countermass 20 to allow the countermass 20 to move along two corresponding railings 28 which are fixed to the bridge. Adjustable brakes 24, well known in the art, are attached to the wheels 22 to provide a frictional force which opposes the motion of the countermass 20. This frictional force dissipates the dynamic energy of the countermass 20.

The stiffness of the torsion bars 32 and the mass of the countermass 20 are selected so that the natural frequency of the damping system 10 is approximately equal to the natural frequency of the bridge.

Reference is now made to FIGS. 5, 6 and 7 which illustrate another embodiment of the present invention in which a damping system 10 is attached to a ship to stabilize the ship against oscillatory roll. Here, two torsion bars 32 have first ends fixed to the ship with the longitudinal axis of each torsion bar 32 parallel to the length of the ship. Two spools 34 are respectively fixed to the second ends of the torsion bars 32. Each spool 34 is attached to the ship by way of a bracket 35 which constrains tangential movement of the spool 34 while permitting rotational movement of the spool 34. Two sheaves 36 are respectively attached to the ship by way of corresponding A-frames 37 such that a line containing the two sheaves 36 perpendicularly intersects the line of motion of the countermass 20 with the two sheaves 36 equidistant from the countermass 20 at any point along the line of motion of the countermass 20. Two equally tensioned cables 38 having first ends connected to the countermass 20 are respectively strung across the sheaves 36 and attached to a corresponding one of the two spools 34. Means, well known in the art, for keeping each cable 38 on its corresponding sheave 36 are attached to each sheave 36. A sufficient length of each cable 38 is wrapped around its corresponding spool 34 to enable the countermass 20 to oscillate. Preferably each spool 34 is a steel drum and the cables 38 are made of a wire rope. Reference is now made to FIGS. 5 and 7 in which the countermass 20 is similar to the countermass in FIG. 4 and rides along two rails 29. The horizontal rails 29 are parallel to the width of the ship and are preferably convex.

Another embodiment of the present invention is shown in FIGS. 8 and 9 where a damping system 10 is attached to the top of a building to attenuate transverse oscillation of the building caused by wind or other external forces. The damping system 10 of this embodiment consists of three similar coulomb dampened spring-mass assemblies 19 each having a countermass 20 which oscillates horizontally when the building is subject to transverse forces. Preferably, the lines of motion of all three countermasses 20 are coplanar with the line of motion of each countermass 20 forming a 120-degree line of motion with the other two lines of motion. Although the following description refers to only one coulomb dampened spring-mass assembly 19, the description depicts all three spring-mass assemblies 19 since all three are similar.

The coulomb dampened spring-mass assembly 19 includes two vertical parallel torsion bars 32, two spools 34, two cables 38 and a countermass 20. The two torsion bars 32 have lower ends fixed to the building with the longitudinal axis of each torsion bar normal to the line of motion of the countermass 20. The two spools 34 are respectively attached to the upper ends of the torsion bars 32 with the two spools 34 equidistant from any point along the line of motion of the countermass 20. Each spool 34 is attached to the structure by way of a bracket (not shown) or other means well known in the art for constraining tangential movement of the spool 34 while permitting rotational movement of the spool 34. The two cables 38 have first ends respectively connected to the spools 34 and second ends connected to the countermass 20 with a sufficient length of each cable 38 wrapped around its corresponding spool 34 to enable the countermass 20 to oscillate. Preferably, a roller 35 with a diameter equal to the diameter of each spool 34 is attached adjacent to each spool 34 to maintain symmetry of lateral rope movement. Reference is again made to FIG. 4 which illustrated the countermass 20 having a plurality of wheels 22 to allow the countermass 20 to move along two corresponding railings 28 which are fixed to the building. Additionally, adjustable brakes 24, well known in the art, are attached to the wheels 22 to provide a frictional force which opposes the motion of the countermass 20.

Reference is made to FIGS. 10 and 11 which illustrate yet another embodiment of the present invention in which a tuned mass damping system 10 is attached to a tower for generating power from the wind-induced oscillation of the tower. In this embodiment the top end of a vertical cantilever structure 32 is rigidly attached to the tower with a countermass 20 attached to the bottom end of the cantilever structure 32. Preferably, the cantilever structure 32 and the countermass 20 are selected to match the natural frequency of the tower. Oscillation of the countermass 20 rotates a track 42 about a flywheel 40 by way of a sliding mass-bar linkage having a tie rod 44 in which one end of the tie bar 44 is connected to the countermass 20 by a universal joint 48 with the other end of the tie rod 44 pivotably connected to a block 46 which slides along the track 42. The tie rod 44 is of sufficient length to permit the track 42 to rotate as the countermass 20 oscillates. A plurality of calipers 50 attached to the track 42 frictionally press against the face of the flywheel 40 to rotate the flywheel 40 as the track 42 rotates. The rotor of a generator (not shown) is attached to the flywheel 40 to generate electricity by dissipating the dynamic energy of an oscillating tower.

Preferably, the field current in the generator can be varied to control the resistance of the flywheel 40 to rotation, so that the flywheel 40 rotates at the oscillation frequency of the countermass 20 and cantilever structure 32. Additionally, a horizontal circular track can be provided on which the flywheel 40 and generator can pivot relative to the countermass 20 for adjustment to wind direction.

While the principals of the invention have now been made clear in an illustrative embodiment, there will become obvious to those skilled in the art many modifications in structure, arrangement, portions and components used in the practice of the invention and otherwise which are particularly adapted for specific environments and operating requirements without departing from those principals. The appended claims are therefore intended to cover and embrace any such modifications, within the limits only of the true spirit and scope of the invention.

We claim:

1. A damping system for attenuating the motion of a structure caused by external forces, said motion characterized by the vibration, rocking, or undulation of said structure, said damping system comprising:
   (a) a countermass;
   (b) means for enabling said countermass to oscillate in a translational manner relative to said structure, comprising:
      (i) two torsion bars each having first ends attached to said structure with the longitudinal axis of each torsion bar normal to the line of motion of said countermass relative to said structure;
      (ii) two spools respectively attached to second ends of said torsion bars;
      (iii) two pulleys respectively attached to said structure equidistant along a line normal to the line motion of said countermass;
      (iv) two equally tensioned cables having first ends respectively connected to said spools and second ends connected to said countermass with said pulleys each connecting one of said two cables to provide an equal tension on said countermass and with a sufficient length of each cable wrapped around said corresponding spool to enable the oscillation of said countermass;
   (c) means for frictionally damping said oscillating motion of said countermass relative to said structure; and wherein
   (d) said damping system has a frequency of oscillation matching the natural frequency of oscillation of said structure.

2. A damping system according to claim 1 further comprising a spring having a first end attached to said structure and a second end attached to said countermass to enable said countermass to oscillate in a translational manner relative to said structure.

3. A damping system according to claim 2 wherein said countermass frictionally rests against said structure to frictionally dampen the oscillating motion of said countermass relative to said structure.

4. A damping system according to claim 2 further comprising:
   (a) a plurality of wheels attached to said countermass to enable said countermass to ride on said structure in the direction of said oscillation of said countermass; and
   (b) variable braking means attached to said wheels for frictionally damping said oscillatory motion of said countermass relative to said structure.

5. A damping system according to claim 1 wherein said countermass frictionally rests against said structure to frictionally dampen the oscillating motion of said countermass relative to said structure.

6. A damping system according to claim 1 further comprising:
   (a) a plurality of wheels attached to said countermass to enable said countermass to ride on said structure in a direction of the oscillation of said countermass; and
   (b) variable braking means attached to said wheels for frictionally damping the oscillatory motion of said countermass relative to said structure.

7. A damping system according to claim 1 wherein said means for enabling said countermass to oscillate comprises:
   (a) two parallel torsion bars each having first ends attached to said structure with the longitudinal axis of each torsion bar normal to the line of motion of said countermass relative to said structure, each of said torsion bars having second ends equidistant from said countermass at any point along the motion of said countermass relative to said structure;
   (b) two spools respectively attached to the second ends of said torsion bars; and
   (c) two equally tensioned cables having first ends respectively connected to said spools and second ends connected to said countermass with a sufficient length of each cable wrapped around said spool to enable the oscillation of said countermass.

8. A damping system according to claim 7 wherein said countermass frictionally rests against said structure to frictionally dampen the oscillating motion of said countermass relative to said structure.

9. A damping system according to claim 7 further comprising:
   (a) a plurality of wheels attached to said countermass to enable said countermass to ride on said structure in a direction of the oscillation of said countermass; and
   (b) variable braking means attached to said wheels for frictionally damping the oscillatory motion of said countermass relative to said structure.

10. A device for stabilizing a vertical elongated structure against transverse oscillation comprising a first coulomb dampened spring-mass assembly attached to said structure, said assembly having a frequency of oscillation matching the natural frequency of oscillation of said structure and including:
    (a) a countermass;
    (b) two torsion bars each having first ends fixed to said structure with the longitudinal axis of each torsion bar normal to the line of motion of said countermass relative to said structure;
    (c) two spools respectively attached to second ends of said torsion bars;
    (d) two pulleys respectively attached to said structure equidistant along a line normal to the line of motion of said countermass;
    (e) two equally tensioned cables having first ends respectively connected to said spools and second ends connected to said countermass with said pulleys each contacting one of said two cables to provide an equal tension on said countermass and with a sufficient length of each cable wrapped around said corresponding spool to enable the oscillation of said countermass; and
    (f) means for frictionally damping the motion of said countermass relative to said structure.

11. A device for stabilizing a structure against transverse oscillation according to claim 10 wherein said first coulomb dampened spring-mass assembly comprises:
    (a) a countermass;
    (b) a coil spring having a first end attached to said structure and a second end attached to said countermass to enable said countermass to oscillate in a horizontal direction relative to said structure; and
    (c) means for frictionally damping the motion of said countermass relative to said structure.

12. A device for stabilizing a structure against transverse oscillation according to claim 11 further comprising a second and third coulomb dampened spring-mass assemblies both similar to said first coulomb dampened spring-mass assembly said second and third coulomb dampened spring-mass assemblies being attached to said structure such that the line of motion of each of said three spring-mass assemblies forms approximately a 120-degree angle with the lines of motion of the other two spring-mass assemblies.

13. A device for stabilizing a structure against transverse oscillation according to claim 10 wherein said first coulomb dampened spring-mass assembly comprises:
    (a) a countermass;
    (b) two torsion bars each having first ends fixed to said structure with the longitudinal axis of each torsion bar normal to the line of motion of said countermass relative to said structure;
    (c) two spools respectively attached to second ends of said torsion bars;
    (d) two pulleys respectively attached to said structure equidistant along a line normal to the line of motion of said countermass;
    (e) two equally tensioned cables having first ends respectively connected to said spools and second ends connected to said countermass with said pulleys each contacting one of said two cables to provide an equal tension on said countermass and with a sufficient length of each cable wrapped around said corresponding spool to enable the oscillation of said countermass; and
    (f) means for frictionally damping the motion of said countermass relative to said structure.

14. A device for stabilizing a structure against transverse oscillation according to claim 10 further comprising a second and third coulomb dampened spring-mass assemblies both similar to said first coulomb dampened spring-mass assembly said second and third coulomb dampened spring-mass assemblies being attached to said structure such that the line of motion of each of said three spring-mass assemblies forms approximately a 120-degree angle with the lines of motion of the other two spring-mass assemblies.

15. A device for stabilizing a structure against transverse oscillation according to claim 10 wherein said first coulomb dampened spring-mass assembly comprises:
 (a) a countermass;
 (b) two parallel torsion bars each having first ends fixed to said structure with the longitudinal axis of each torsion bar normal to the line of motion of said countermass relative to said structure, each of said torsion bars having second ends equidistant from said countermass at any point along the motion of said countermass relative to said structure;
 (c) two spools respectively attached to the second ends of said torsion bars;
 (d) two equally tensioned cables having first ends respectively connected to said spools and second ends connected to said countermass with a sufficient length of each cable wrapped around said spool to enable the oscillation of said countermass; and
 (e) means for frictionally damping the motion of said countermass relative to said structure.

16. A device for stabilizing a structure against transverse oscillation according to claim 15 further comprising a second and third coulomb dampened spring-mass assemblies both similar to said first coulomb dampened spring-mass assembly said second and third coulomb dampened spring-mass assemblies being attached to said structure such that the line of motion of each of said three spring-mass assemblies forms approximately a 120-degree angle with the lines of motion of the other two spring-mass assemblies.

* * * * *